US011967882B2

(12) United States Patent
Fleury et al.

(10) Patent No.: US 11,967,882 B2
(45) Date of Patent: Apr. 23, 2024

(54) RADIALLY STACKED ACTUATOR

(71) Applicant: Apptronik, Inc., Austin, TX (US)

(72) Inventors: Paul Gloninger Fleury, Austin, TX (US); Nicholas Arden Paine, Austin, TX (US); Jonas Alexan Fox, Austin, TX (US)

(73) Assignee: Apptronik, Inc., Austin, TX (US)

( * ) Notice: Subject to any disclaimer, the term of this patent is extended or adjusted under 35 U.S.C. 154(b) by 0 days.

(21) Appl. No.: 18/254,116

(22) PCT Filed: Dec. 7, 2022

(86) PCT No.: PCT/US2022/052162
§ 371 (c)(1),
(2) Date: May 23, 2023

(87) PCT Pub. No.: WO2023/107575
PCT Pub. Date: Jun. 15, 2023

(65) Prior Publication Data
US 2023/0344306 A1    Oct. 26, 2023

Related U.S. Application Data

(60) Provisional application No. 63/286,834, filed on Dec. 7, 2021.

(51) Int. Cl.
*B25J 9/12* (2006.01)
*B25J 9/10* (2006.01)
*H02K 7/116* (2006.01)

(52) U.S. Cl.
CPC ............ *H02K 7/116* (2013.01); *B25J 9/1025* (2013.01); *B25J 9/126* (2013.01)

(58) Field of Classification Search
CPC .......... B25J 9/1025; B25J 9/126; H02K 7/116
See application file for complete search history.

(56) References Cited

U.S. PATENT DOCUMENTS

2019/0263007 A1 *  8/2019  Cui ........................ B25J 9/104

FOREIGN PATENT DOCUMENTS

| CN | 211377831     |   | 8/2020  |           |
|----|---------------|---|---------|-----------|
| CN | 211377831 U   | * | 8/2020  |           |
| CN | 211508834 U   | * | 9/2020  |           |
| DE | 102021116354 B3 | * | 9/2022 |           |
| DE | 102022209373 A1 | * | 3/2023 | B60K 1/00 |
| JP | 2002-320366   |   | 10/2002 |           |
| JP | 2002320366 A  | * | 10/2002 |           |
| JP | 2014-204480   |   | 10/2014 |           |

(Continued)

OTHER PUBLICATIONS

International Search Report and Written Opinion in International Appln. No. PCT/US2022/052162, dated Apr. 28, 2023, 9 pages.

Primary Examiner — Randell J Krug
(74) Attorney, Agent, or Firm — Fish & Richardson P.C.

(57) ABSTRACT

A radial stacked actuator includes an actuator ground; a motor including a motor ground constrained to the actuator ground with one or more rotational degrees of freedom; a spring coupled between the motor ground and the actuator ground; a gearbox coupled to the motor at an input of the gearbox; and an actuator output coupled to an output of the gearbox. The spring is configured to deflect as the motor ground rotates relative to the actuator ground.

49 Claims, 10 Drawing Sheets

(56) References Cited

FOREIGN PATENT DOCUMENTS

| | | | |
|---|---|---|---|
| JP | 2014204480 A * | 10/2014 | |
| WO | WO 2014/009915 | 1/2014 | |
| WO | WO-2014009915 A2 * | 1/2014 | ........... A61C 17/225 |
| WO | WO-2023159252 A1 * | 8/2023 | |

* cited by examiner

RADIALLY STACKED ACTUATOR

CROSS-REFERENCE TO RELATED APPLICATIONS

This application is a national phase application under 35 U.S.C. § 371 of PCT Application No. PCT/US2022/052162, filed on Dec. 7, 2022, which claims the benefit of U.S. Provisional Patent Application No. 63/286,834, filed Dec. 7, 2021. The entire contents of both prior applications are incorporated herein by reference.

GOVERNMENT LICENSE RIGHTS

This invention was made with government support under Contract Numbers H92222-17-C-0074 and H92222-17-C-0050 awarded by the Department of Defense designated Headquarters U.S. Special Operations Command (USSOCOM). The government has certain rights in the invention.

TECHNICAL BACKGROUND

The present disclosure describes actuators for robotic systems, such as humanoid robots.

BACKGROUND

Humanoid robots have a body shape that resembles the human body. The human envelope, however, limits the volume available for housing the actuators used to move the limbs, head, etc. of the robot. Because larger actuators generally provide better performance, there is a tradeoff between shape and performance—that is, there is a tradeoff between using actuators that are small enough to allow the robot to generally fit within the human envelope and the performance of the robot. What is desired then, are actuators that provide a better performance-to-volume ratio.

SUMMARY

Embodiments described herein provide radially stacked series elastic actuators. Even more particularly, some embodiments provide reverse-style series elastic actuators. An example embodiment of a radially stacked series elastic actuator comprises an actuator ground and a motor, a gearbox, and an actuator output circumferentially contained in the actuator ground. The load path from the actuator ground to the actuator output can be radial.

According to an example embodiment, the motor comprises a motor ground and an actuator ground that are constrained to each other with a single rotational degree of freedom. A spring, such as a planar torsion spring, can be coupled between the motor ground and the actuator ground such that the spring deflects as the motor ground rotates relative to the actuator ground. A spring displacement sensor can be provided to measure the displacement of the motor ground relative to the actuator ground. In an example embodiment, the spring displacement sensor is a capstan-reduction encoder that amplifies torque resolution.

According to an example embodiment, the motor output is coupled to the input of the gearbox and the output of the gearbox is coupled to the actuator output. In some embodiments, the gearbox is circumferentially contained within the motor ground. The gearbox can be a harmonic drive in some embodiments. According to an example embodiment, the harmonic drive comprises a circular spline that is fixed relative to the motor ground, a wave generator that rotates with the motor output, a flex spline that is coupled to the actuator output, and a wave generator bearing into which the wave generator is inserted and that contacts the flex spline based on the position of the wave generator to cause the flex spline to mesh with the circular spine in limited areas.

Some embodiments comprise an actuator output sensor. The actuator output sensor, according to an example embodiment, comprises a read head that is fixed relative to the motor ground and magnet that spins with the actuator output. The read head reads the magnetic field of the magnet to output a signal indicative of the position of the actuator relative to the motor ground. Embodiments can include other sensors, such as a commutation sensor used for motor control.

In some embodiments, one or more sensors can be located in the gearbox. Even more particularly, sensors can be located in an interior area of the flex spline. By way of example, but not limitation, the actuator output sensor and the commutation sensor can be located in the interior area of the flex spline. In another embodiment, the magnet used by the actuator output sensor can be located at a location distal from the gearbox or the actuator output.

In an example implementation, a radial stacked actuator includes an actuator ground; a motor including a motor ground constrained to the actuator ground with one or more rotational degrees of freedom; a spring coupled between the motor ground and the actuator ground; a gearbox coupled to the motor at an input of the gearbox; and an actuator output coupled to an output of the gearbox. The spring is configured to deflect as the motor ground rotates relative to the actuator ground.

In an aspect combinable with the example implementation, a load path defined from the actuator ground to the actuator output is radial.

In another aspect combinable with any of the previous aspects, the spring includes a planar torsion spring.

Another aspect combinable with any of the previous aspects further includes a spring displacement sensor configured to measure a displacement of the motor ground relative to the actuator ground.

In another aspect combinable with any of the previous aspects, the spring displacement sensor includes a capstan-reduction encoder configured to amplify a torque resolution.

In another aspect combinable with any of the previous aspects, the spring displacement sensor is configured to measure at least one of a total force or torque applied by the actuator.

Another aspect combinable with any of the previous aspects further includes an actuator output sensor.

In another aspect combinable with any of the previous aspects, the actuator output sensor is configured to determine an angular displacement of the actuator output relative to the motor ground.

In another aspect combinable with any of the previous aspects, respective outputs of the spring displacement sensor and the actuator output sensor are configured to determine a position of the actuator output relative to the actuator ground.

In another aspect combinable with any of the previous aspects, the one or more rotational degrees of freedom is a single degree of rotational freedom.

In another aspect combinable with any of the previous aspects, the gearbox is circumferentially contained within the motor ground.

In another aspect combinable with any of the previous aspects, the gearbox includes a harmonic drive.

In another aspect combinable with any of the previous aspects, the harmonic drive includes a circular spline that is fixed relative to the motor ground; a wave generator configured to rotate with the motor output; a flex spline that is coupled to the actuator output; and a wave generator bearing configured to receive the wave generator contact the flex spline based on a position of the wave generator to cause the flex spline to mesh with the circular spine.

Another aspect combinable with any of the previous aspects further includes one or more sensors positioned in the gearbox.

In another aspect combinable with any of the previous aspects, the one or more sensors are positioned in an interior area of the flex spline.

In another aspect combinable with any of the previous aspects, the one or more sensors includes at least one of an actuator output sensor or a commutation sensor.

Another aspect combinable with any of the previous aspects further includes an actuator output sensor.

In another aspect combinable with any of the previous aspects, the actuator output sensor includes a read head that is fixed relative to the motor ground; and a magnet configured to spin with the actuator output.

In another aspect combinable with any of the previous aspects, the read head is configured to read a magnetic field of the magnet and output a signal indicative of the position of the actuator relative to the motor ground based on the magnetic field.

In another aspect combinable with any of the previous aspects, the magnet is positioned at a location distal from at least one of the gearbox or the actuator output.

In another aspect combinable with any of the previous aspects, the spring is a first spring, and the actuator further includes a second spring positioned between the gearbox and the actuator output.

In another aspect combinable with any of the previous aspects, the second spring is configured to deflect as the actuator ground rotates relative to the actuator output.

Another aspect combinable with any of the previous aspects further includes an actuator housing that includes the actuator ground.

In another aspect combinable with any of the previous aspects, the actuator housing includes a cylindrical housing defined by a circumference that varies along a longitudinal axis of the actuator housing.

In another aspect combinable with any of the previous aspects, each of the motor, the gearbox, and the actuator output includes a circular cross-section defined by a dimension that varies along a respective longitudinal axis.

In another aspect combinable with any of the previous aspects, the actuator ground is configured to fix to a first portion of a humanoid robot, and the actuator output is configured to fix to a second portion of the humanoid robot.

In another example implementation, a method includes operating a radial stacked actuator that includes an actuator ground, a motor including a motor ground constrained to the actuator ground, a spring coupled between the motor ground and the actuator ground, a gearbox coupled to the motor at an input of the gearbox, and an actuator output coupled to an output of the gearbox. The method further includes, during operation, rotating the motor ground relative to the actuator ground with one or more rotational degrees of freedom; and based on the relative movement of the motor ground and actuator ground, deflecting the spring.

In an aspect combinable with the example implementation, a load path defined from the actuator ground to the actuator output is radial.

In another aspect combinable with any of the previous aspects, the spring includes a planar torsion spring.

In another aspect combinable with any of the previous aspects, the radial stacked actuator further includes a spring displacement sensor.

Another aspect combinable with any of the previous aspects further includes measuring a displacement of the motor ground relative to the actuator ground with the spring displacement sensor.

In another aspect combinable with any of the previous aspects, the spring displacement sensor includes a capstan-reduction encoder configured to amplify a torque resolution.

Another aspect combinable with any of the previous aspects further includes measuring at least one of a total force or torque applied by the actuator with the spring displacement sensor.

In another aspect combinable with any of the previous aspects, the radial stacked actuator further includes an actuator output sensor.

Another aspect combinable with any of the previous aspects further includes determining an angular displacement of the actuator output relative to the motor ground with the actuator output sensor.

Another aspect combinable with any of the previous aspects further includes determining a position of the actuator output relative to the actuator ground with respective outputs of the spring displacement sensor and the actuator output sensor.

In another aspect combinable with any of the previous aspects, the one or more rotational degrees of freedom is a single degree of rotational freedom.

In another aspect combinable with any of the previous aspects, the gearbox is circumferentially contained within the motor ground.

In another aspect combinable with any of the previous aspects, the gearbox includes a harmonic drive.

In another aspect combinable with any of the previous aspects, the harmonic drive includes a circular spline that is fixed relative to the motor ground; a wave generator that rotates with the motor output; a flex spline that is coupled to the actuator output; and a wave generator bearing configured to receive the wave generator contact the flex spline based on a position of the wave generator to cause the flex spline to mesh with the circular spine.

In another aspect combinable with any of the previous aspects, the radial stacked actuator further includes one or more sensors positioned in the gearbox.

In another aspect combinable with any of the previous aspects, the one or more sensors are positioned in an interior area of the flex spline.

In another aspect combinable with any of the previous aspects, the one or more sensors includes at least one of an actuator output sensor or a commutation sensor.

In another aspect combinable with any of the previous aspects, the radial stacked actuator further includes an actuator output sensor that includes a read head that is fixed relative to the motor ground and a magnet that spins with the actuator output.

Another aspect combinable with any of the previous aspects further includes reading, with the read head, a magnetic field of the magnet; and outputting a signal indicative of the position of the actuator relative to the motor ground based on the read magnetic field.

In another aspect combinable with any of the previous aspects, the magnet is positioned at a location distal from at least one of the gearbox or the actuator output.

In another aspect combinable with any of the previous aspects, the spring is a first spring, and the radial stacked actuator further includes a second spring positioned between the gearbox and the actuator output.

Another aspect combinable with any of the previous aspects further includes deflecting the second spring as the actuator ground rotates relative to the actuator output.

In another aspect combinable with any of the previous aspects, the radial stacked actuator further includes an actuator housing that includes the actuator ground.

In another aspect combinable with any of the previous aspects, the actuator housing includes a cylindrical housing defined by a circumference that varies along a longitudinal axis of the actuator housing.

In another aspect combinable with any of the previous aspects, each of the motor, the gearbox, and the actuator output includes a circular cross-section defined by a dimension that varies along a respective longitudinal axis.

Another aspect combinable with any of the previous aspects further includes fixing the actuator ground to a first portion of a humanoid robot; and fixing the actuator output to a second portion of the humanoid robot.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Embodiments and the various features and advantageous details thereof are explained more fully with reference to the non-limiting embodiments (including those in the attached Appendix, which forms part of this disclosure) that are illustrated in the accompanying drawings and detailed in the following description. Descriptions of well-known starting materials, processing techniques, components, and equipment are omitted to avoid unnecessarily obscuring the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

As mentioned, it can be desirable for a robot to have a generally human form. The interior spaces of such a robot in which components can be housed, particularly in the limbs and neck, can have generally elongated shapes of limited volume. While current actuators can be sized to fit in these spaces, doing so can lead to the actuators being undersized for the desired performance of the robot.

Embodiments described herein provide actuators that can achieve a better performance-to-volume ratio. Embodiments can be optimized for humanoid and human-robot interaction applications. Embodiments described herein can provide superior cumulative performance metrics for a given volume. For example, embodiments can be configured to optimize a combination of two or more of the following performance metrics: torque density (torque/volume), specific torque (torque/mass), torque resolution, bandwidth. Thus, some embodiments can provide superior cumulative performance with respect to torque density (torque/volume), specific torque (torque/mass), torque resolution, and bandwidth. In some embodiments, the actuators have a generally cylindrical shape.

Figure 1:
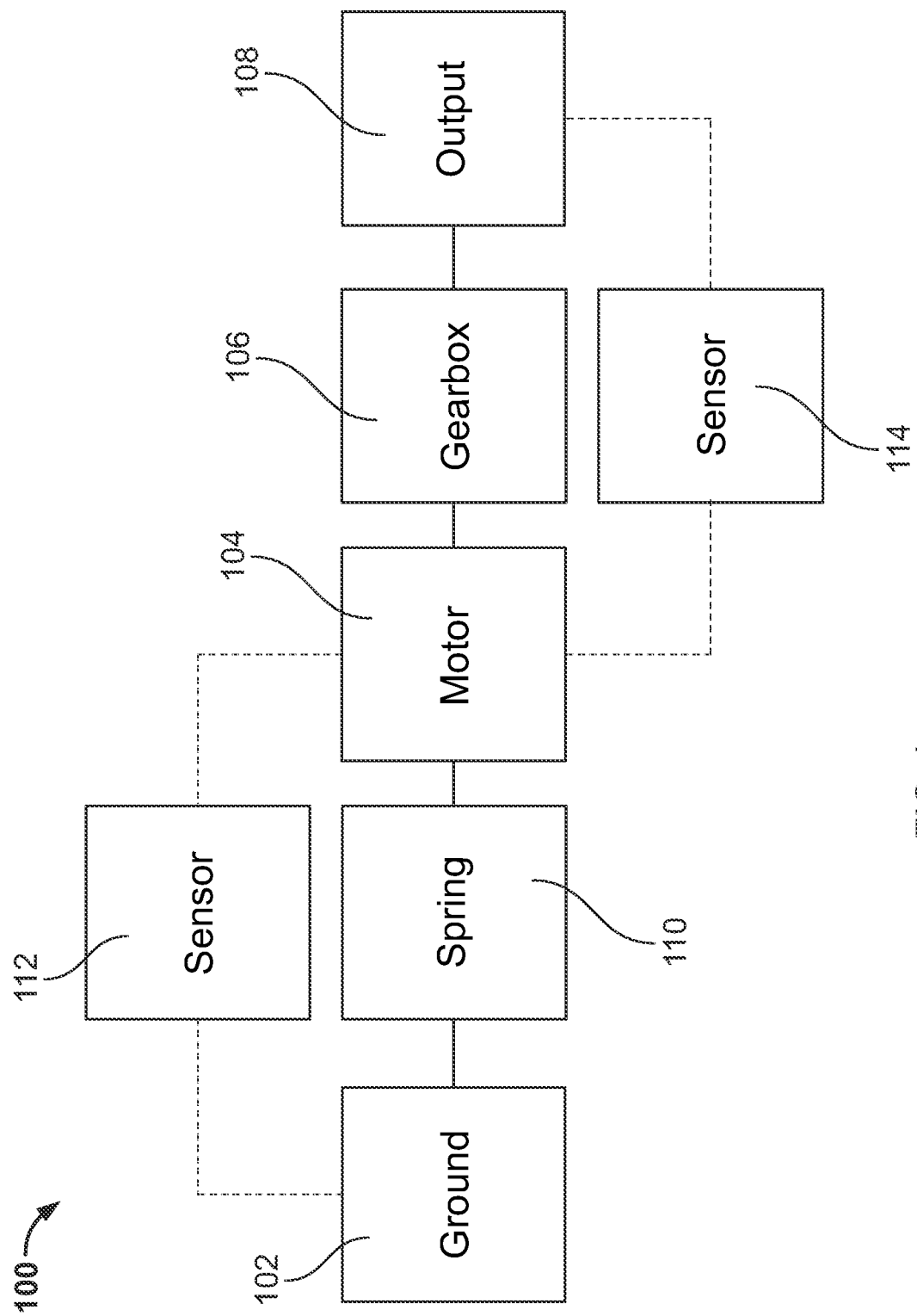
FIG. 1 is a block diagram illustrating an example embodiment of an actuator architecture.

FIG. 1 is a block diagram illustrating an example embodiment of an actuator architecture 100. In the illustrated embodiment, the actuator architecture 100 comprises an actuator ground 102, a motor 104, a gearbox 106, an actuator output 108, a spring 110, a first sensor 112, and a second sensor 114. The actuator ground 102 can be coupled to a support structure, for example, a portion of a robot frame or shell, and the actuator output 108 to a component to be actuated relative to the actuator ground 102. The motor has a motor ground 105 that, in some embodiments, can move relative to the actuator ground 102. By way of example, but not limitation, the motor ground 105 and actuator ground 102 can be constrained to each other with a single rotational degree of freedom. A spring 110 can be located between actuator ground 102 and the motor ground 105. The spring 110 deflects as the motor ground rotates relative to the actuator ground. In other embodiments, a spring (optional) that deflects based on the relative rotation of the actuator output 108 to the actuator ground is positioned between the gearbox 106 and the actuator output 108. The output of the motor 104 is coupled to the input of the gearbox 106, and the output of the gearbox 106 is coupled to the actuator output 108. According to some embodiments, the output of the gearbox 106 is lower speed/higher torque than the input of the gearbox 106.

As an actuator according to the actuator architecture 100 applies load through the actuator output 108, the motor ground 105 can deflect relative to actuator ground 102—that is, change position relative to actuator ground 102. The first sensor 112 measures the force/torque to which the spring 110 is reacting.

A second sensor 114 is coupled between the motor 104 and the actuator output 108 to measure the movement of actuator output 108 relative to the motor 104—for example, the rotation of actuator output 108 relative to the motor ground 105. The combination of information from first sensor 112 (e.g., a torque signal) and the second sensor 114 (e.g., a signal that corresponds the relative position of actuator output 108 to the motor ground) can be used to determine the position of the actuator output 108 relative to the actuator ground 102.

The actuator architecture 100 can be implemented in a radially stacked manner such that the load path between the actuation load path from the actuator ground 202 to the actuator output is radial. In a radially stacked arrangement, one or more of the motor 104, the gearbox 106, the actuator output 108, or the spring 110 are circumferentially contained within the actuator ground 102. Such radial stacking can be achieved in many ways. FIG. 2 through FIG. 10 below illustrate example embodiments of radially stacked actuators according to the actuator architecture 100. While the functional components of the actuator architecture 100 of FIG. 1 are arranged as a reverse-style series elastic actuator, the components can be arranged as a common (i.e., non-reverse) style series elastic actuator.

Figure 2:
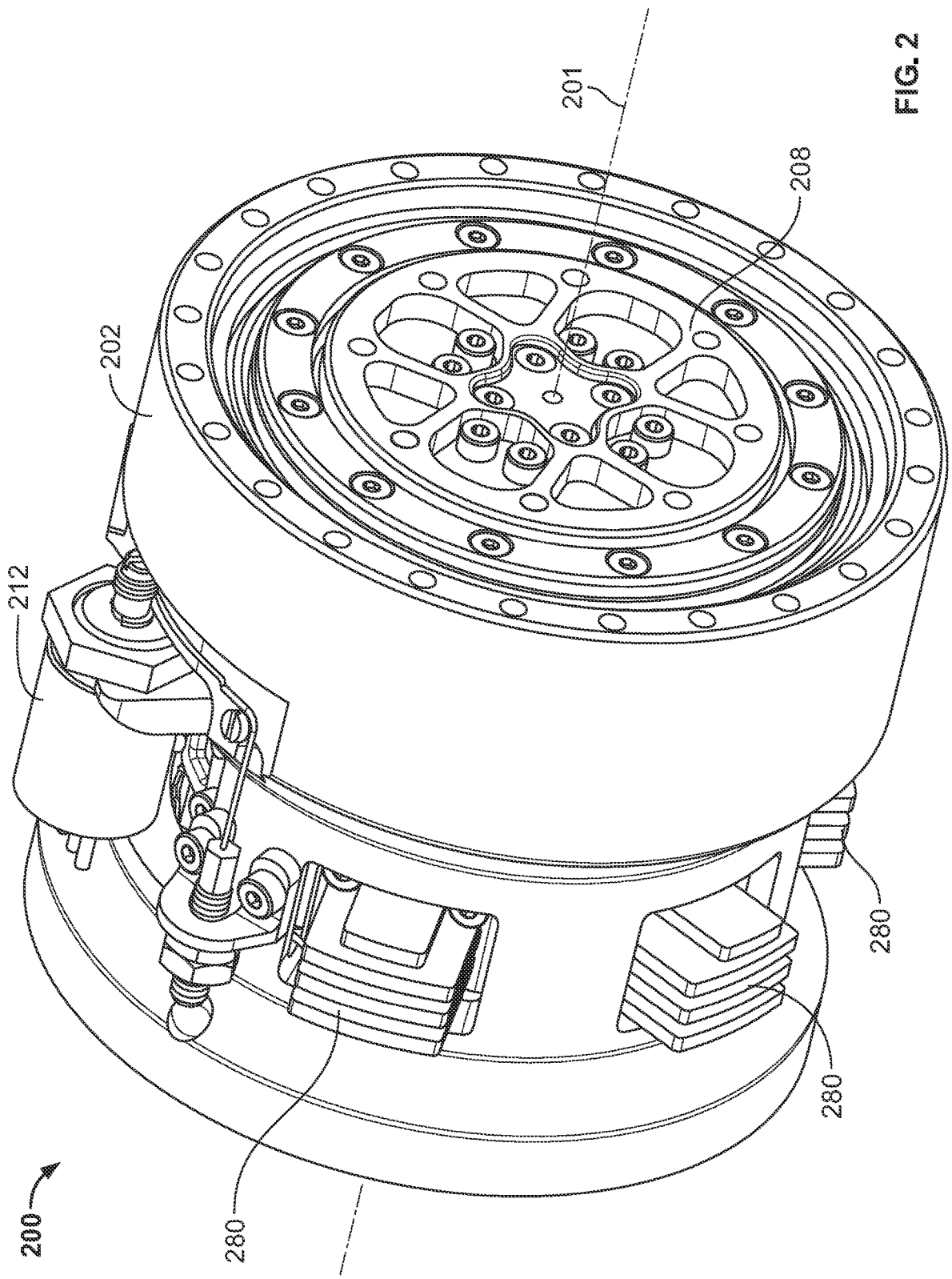
FIG. 2 is a diagrammatic representation of a first view of an example embodiment of an actuator.
Figure 3:
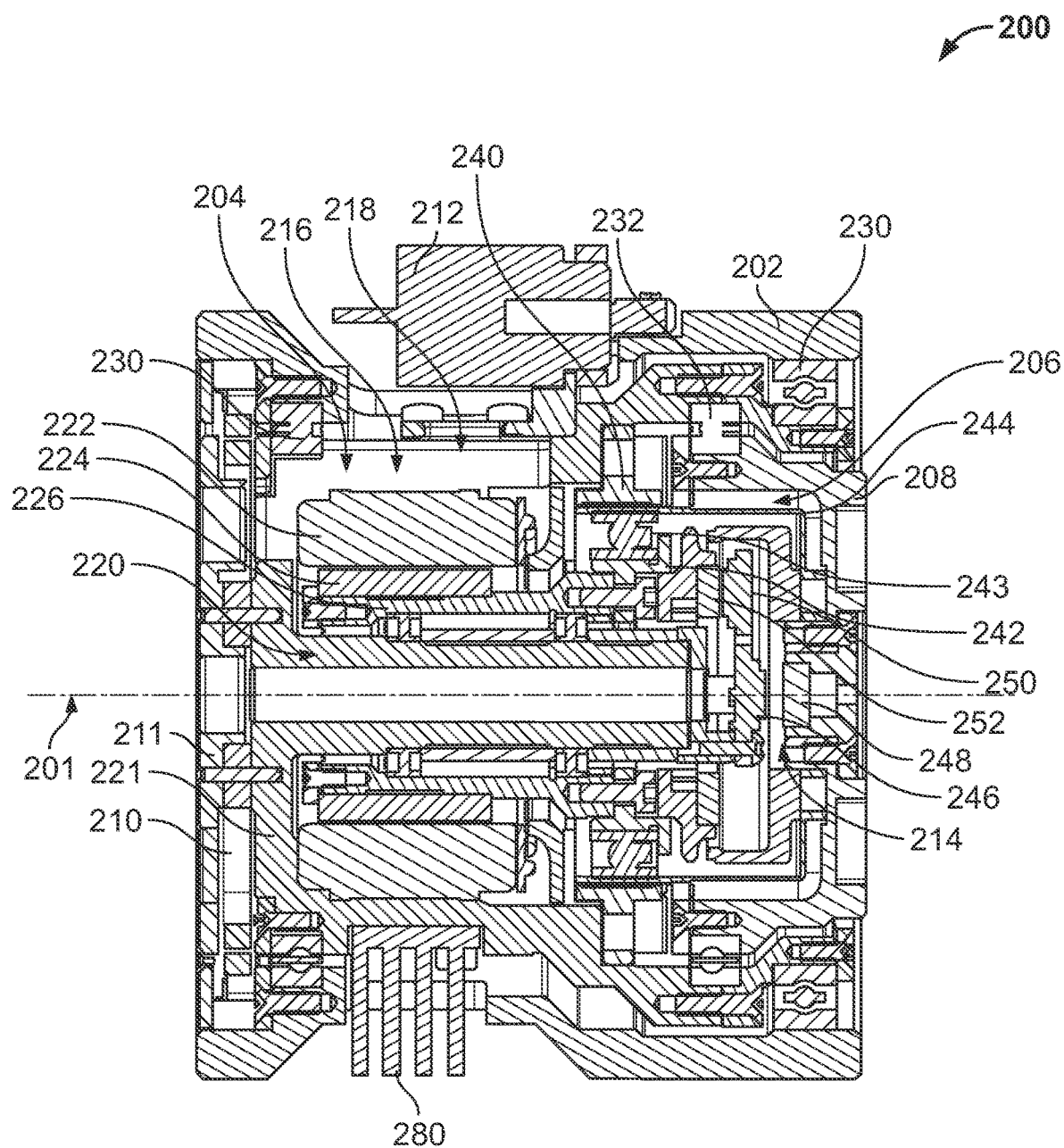
FIG. 3 is a diagrammatic representation of a longitudinal cross-sectional view of an example embodiment of an actuator.
Figure 4:
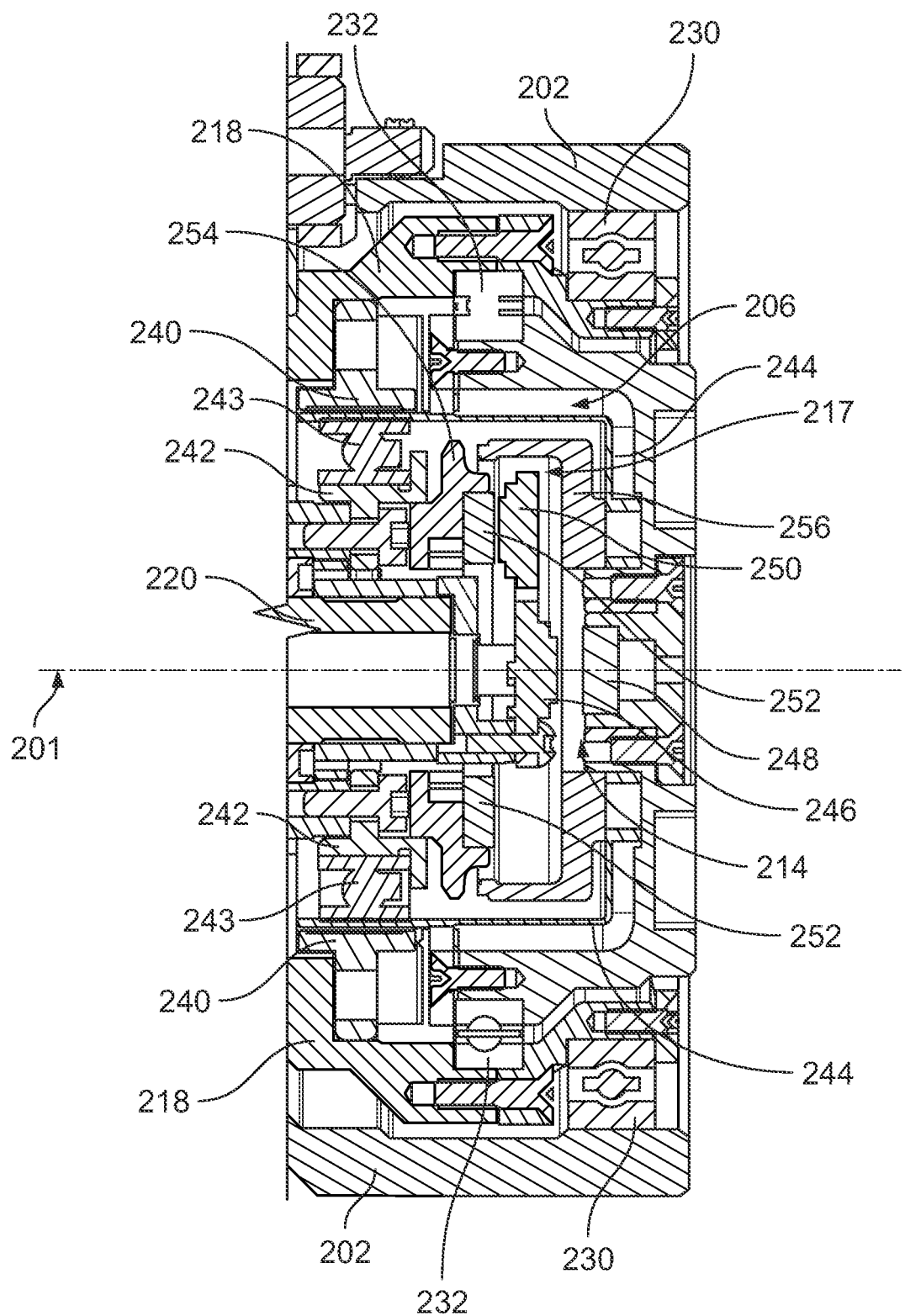
FIG. 4 is a diagrammatic representation of a detail view of an example embodiment of a gearbox.
Figure 5:
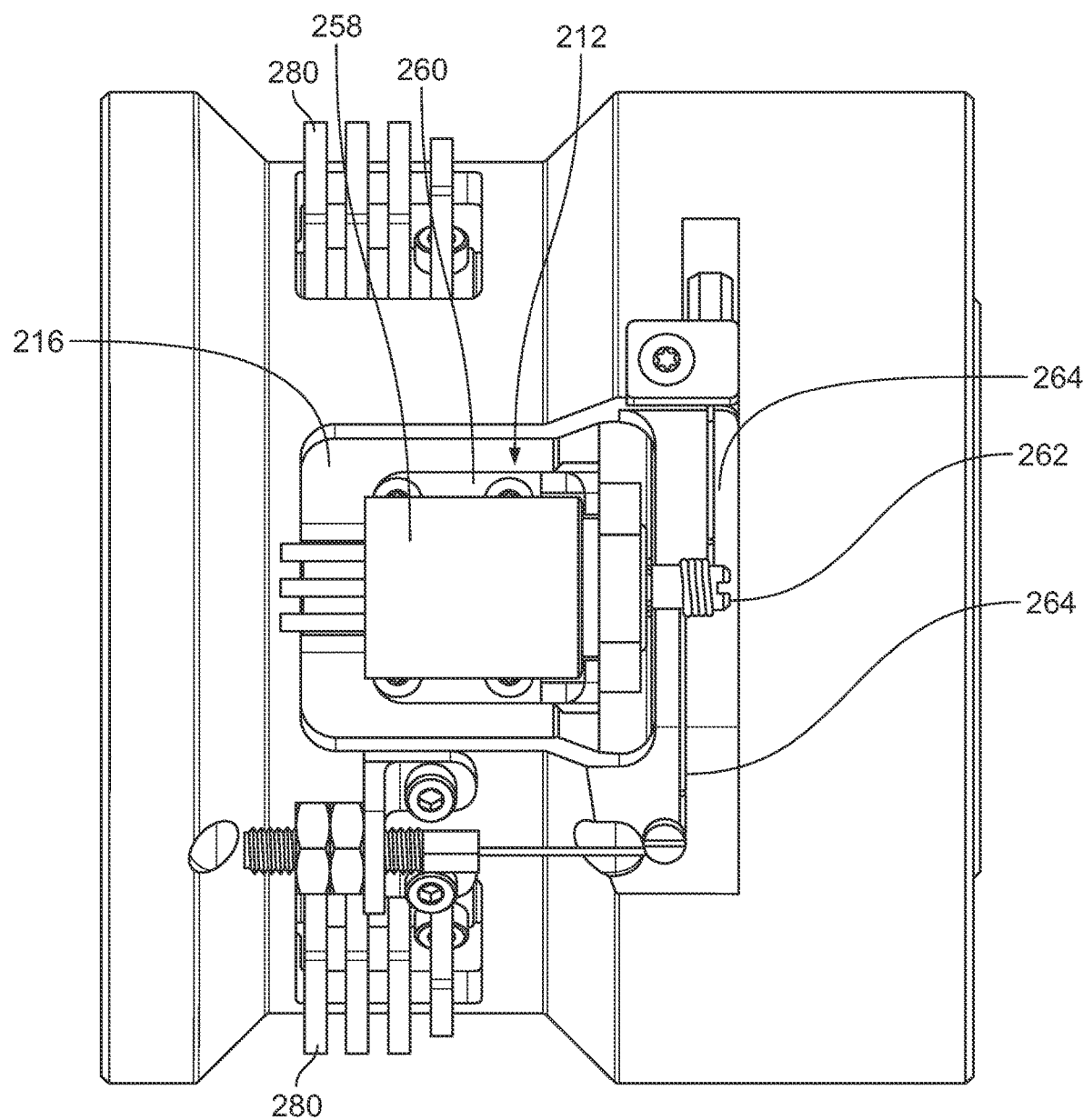
FIG. 5 is a diagrammatic representation of a top view of an example embodiment of an actuator.
Figure 6:
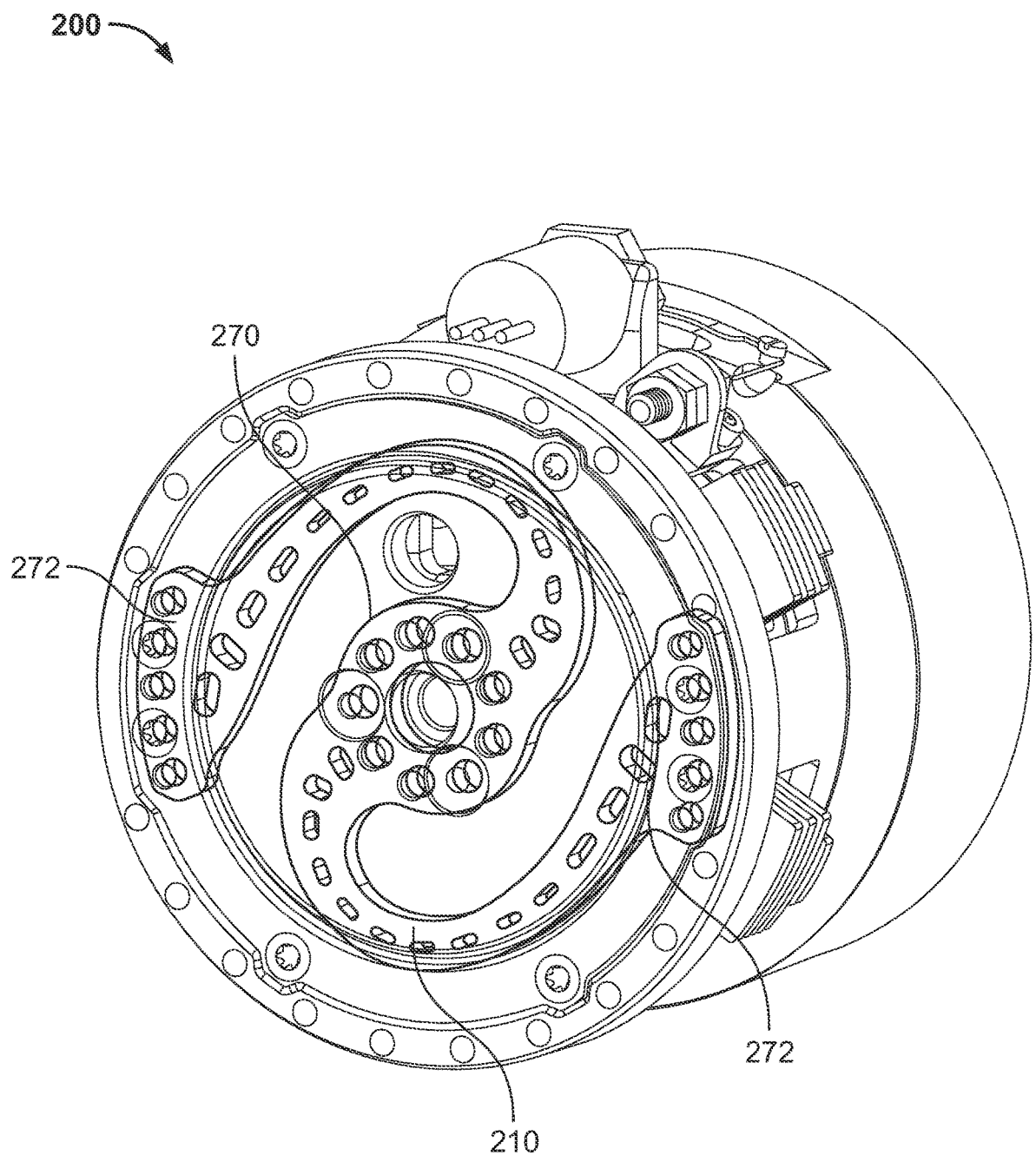
FIG. 6 is a diagrammatic representation of an example embodiment of the example actuator showing an actuator spring to bias an actuator motor.

FIG. 2 is a diagrammatic representation of a first view of an example embodiment of an actuator 200, FIG. 3 is a diagrammatic representation of a longitudinal cross-sectional view of an example embodiment of the actuator 200, FIG. 4 is a diagrammatic representation of a detail view of an example embodiment of a gearbox of the actuator 200, FIG. 5 is a diagrammatic representation of a top view of an example embodiment of the actuator, and FIG. 6 is a diagrammatic representation of an example embodiment of the example actuator showing an example actuator spring that is used in measure torque. Actuator 200 is depicted as a reverse-style series elastic actuator with a load path from an actuator ground to a spring to a motor to a gearbox to an actuator output, in which the load path is implemented radially.

In the illustrated embodiment, the actuator 200 comprises an actuator ground 202 provided by an actuator housing 202 (e.g., a shell, a frame, or another structure) that acts as the mechanical ground of the actuator 200. The actuator ground 202 has a cylindrical shape with an outer circumference about the longitudinal axis 201 that can vary along the length of the actuator ground 202. Thus, as illustrated in FIG. 2, the actuator 200 has a generally cylindrical shape that can fit within a cylindrical envelope having a circumference defined by the maximum circumference of the actuator housing 202 or actuator ground 202 about the longitudinal axis 201.

With reference to FIG. 3, the actuator ground 202 defines a cavity—for example, a cylindrical cavity, the diameter of which can vary along the length of the cavity—in which various components of actuator 200 are located. More particularly, the actuator 200 includes a motor 204, a gearbox 206, an actuator output 208, and a spring 210 that are circumferentially contained within the actuator ground 202. Each of the motor 204, the gearbox 206, and the actuator output 208 can have a circular cross-section with a radius that varies along the length of the respective feature. In the illustrated embodiment, the motor 204, the gearbox 206, the actuator output 208, the spring 210 have longitudinal axes and axes of rotation that are coaxial with the longitudinal axis 201. In other embodiments, the longitudinal axis or the axis of rotation of one or more of the motor 204, the gearbox 206, the actuator output 208, or the spring 210 are not coincident.

Actuator 200 can include a sensor system to measure a variety of parameters such as, but not limited to, torque, force, angular displacement, rotational speed, or other parameters. In the embodiment illustrated, actuator 200 includes a spring displacement sensor 212 and an actuator output sensor 214. The output of the spring displacement sensor 212 is used to determine total force or torque applied by the actuator. The output of the actuator output sensor 214 is used to determine the angular displacement of the actuator output 208 relative to the motor ground 216. The information from the spring displacement sensor 212 (e.g., a torque signal) and the actuator output sensor 214 (e.g., a signal that corresponds the relative position of actuator output 208 to the motor ground 216) can be used to determine the position of the actuator output 208 relative to the actuator ground 202. In some embodiments, motor 204 is driven by commutation. For example, the motor 204 can be a brushless DC (BLDC) motor. As such, the sensor system of some embodiments can include a commutation sensor 217 to output a signal indicative of the rotational position of the motor's output or rotor for commutation.

The actuator output 208 rotates relative to the actuator ground 202 about the axis of rotation, which is coincident with the longitudinal axis 201 of the actuator 200. In some embodiments, the load path from the actuator output 208 to the actuator ground 202 is implemented radially. The actuator ground 202 can be coupled to a support structure, such as to the frame or the shell of a robot or another support structure based on application and the actuator output 208 to a component to be actuated relative to the actuator ground 202 and more particularly, relative to the support structure to which the actuator ground 202 is connected. For example, the actuator ground 202 can be fixed to a first portion of a robot and the actuator output 208 connected to a second portion of the robot such that the actuator 200 can drive flexion/extension, internal/external rotation, abduction/adduction, or other movements of the second portion of the robot relative to the first portion of the robot.

The actuator output 208 is driven by the motor 204 through the gearbox 206. The motor 204 comprises a motor ground 216 relative to which certain components of the motor 204, the gearbox 206, and actuator output 208 rotate. In the illustrated embodiment, a motor housing 251 acts as the mechanical ground for the motor 204. The motor housing includes a radially outer housing portion 218 and a center shaft 220 that extend longitudinally from an end portion 221. The radially outer housing portion 218 has a cylindrical shape with an outer circumference and an inner circumference that can vary along the length of the motor housing 251. Bearings 230 are provided between the motor ground 216 and the actuator ground 202 to allow the motor ground 216 to rotate a constrained amount relative to the actuator ground 202. The spring 210, which is protected by a spring cover 211 coupled to the actuator ground 202 in the illustrated embodiment, is disposed between the actuator ground 202 and the motor ground 216. When the motor 204 applies an output, the motor ground 216 can rotate from a neutral position within the actuator ground 202, causing the spring 210 to deflect.

The motor 204 further comprises a stator 222 that is fixed relative to the motor ground 216. For example, stator 222 can be fixed to the inner side of the radially outer housing portion 218. A rotor 224 that is circumferentially within the stator 222 rotates about the center shaft 220. A motor output 226 is connected to the radially inner side of the rotor 224 and rotates about the center shaft 220 with the rotor 224. The motor output 226 is connected to the input of the gearbox 206 and the output of the gearbox 206 is coupled to the actuator output 208. The actuator output 208 is constrained to the motor ground 216 with a bearing 232.

According to an example embodiment, the gearbox 206 is configured to result in a lower speed/higher torque output than the motor 204. In an even more particular embodiment, the gearbox 206 is a harmonic drive. An example embodiment of a harmonic drive gearbox comprises a circular spline 240, a wave generator 242, a wave generator bearing 243, and a flex spline 244. The circular spline 240 is fixed to an inner circumference of the radially outer housing portion 218 of the motor housing or is otherwise fixed relative to the motor ground. The circular spline 240 has radially interior gear teeth that mesh with gear teeth on the flex spline 244. The wave generator 242 has an elliptical shape or another suitable shape and is inserted in the wave generator bearing 243, causing the wave generator bearing 243 to conform at least partially to the shape of the wave generator 242, while still allowing the wave generator 242 to rotate. The wave generator 242 is connected to the rotor 224 via the motor output 226 and, thus, the motor 204 can drive the wave generator 242. The flex spline 244 has a cup (concave) shape. The end of the cup is mounted to the actuator output 208 (for example, to the longitudinally interior side of the actuator output 208 that is opposite to the output side of the actuator output 208) and the sides of the cup extend longitudinally back to pass between the wave generator bearing 243 and the circular spline 240. The radially exterior side of the flex spline 244 has gear teeth to mesh with the gear teeth of the circular spline 240. The harmonic drive converts the output from the motor 204 to a lower speed/higher torque output to drive the actuator output 208.

To facilitate control, various sensors can be provided to determine the position, torque, or other metrics of actuator 200. In an example embodiment, a spring displacement sensor 212 is provided to measure torque based on the rotation of the motor ground 216 relative to the actuator ground 202. The angular displacement of the motor 204, and more particularly, the angular displacement of the motor ground 216 about its axis of rotation (e.g., about the longitudinal axis 201) relative to actuator ground 202 corresponds to the deflection in the spring 210 and hence the force to which the spring 210 is reacting. As such, the output of spring displacement sensor 212 can be used to determine a torque applied between the motor 204 and the actuator ground 202.

A variety of sensor types can be used as the spring displacement sensor 212. In the illustrated embodiment, for example, the spring displacement sensor 212 is a capstan-reduction encoder that amplifies torque resolution. The encoder 258 is fixed to the motor ground 216 (e.g., by a bracket 260 or another structure) and thus moves with the motor ground 216 relative to the actuator ground 202. The encoder 258 includes a rotatable sensor shaft 262, which has an axis of rotation parallel to the axis of rotation of the motor ground 216 relative to the actuator ground 202. For example, in some embodiments, the axis of rotation of rotatable sensor shaft 262 is parallel to the longitudinal axis 201. A cable 264 is wound about the rotatable sensor shaft 262 and the ends of the cable 264 are fixed to the outer circumference of the actuator ground 202. In some embodiments, the ends of the cable 264 are fixed at the same radial distance away as the axis of rotation of the rotatable sensor shaft 262 from the axis of rotation of motor 204 relative to the actuator ground 202 (for example, longitudinal axis 201).

As the motor ground 216 rotates relative to the actuator ground 202, the cable 264 causes the rotatable sensor shaft 262 to rotate. The encoder 258 detects the angular displacement of the rotatable sensor shaft 262, which is related to the angular displacement of the motor ground 216 relative to the actuator ground 202 and hence the displacement of the spring 210. The torque amplification of the arrangement of FIG. 5, will be approximately the ratio of the diameter of the actuator ground 202 where the sensor is located to the diameter of the rotatable sensor shaft 262.

An actuator output sensor 214 can be provided to measure the angular displacement of the actuator output 208 relative to the motor 204. According to an example embodiment, the actuator output sensor is an absolute position sensor (APS)—more particularly, an absolute angle sensor 214. Even more particularly, the actuator output sensor 214 can comprise a rotary encoder to measure the position of actuator output 208 relative to the motor ground 216. In an even more particular embodiment, the actuator output sensor comprises a magnetic rotary encoder. With reference to FIG. 3 and FIG. 4, in an example embodiment, the actuator output sensor 214 of some embodiments comprises a read head 246, such as a magnetic field sensor, and a magnet 248. The read head 246 is coupled to and fixed relative to the motor ground 216. For example, the read head 246 is coupled to the end of center shaft 220 in the illustrated embodiment. The magnet 248 of the encoder is coupled to and rotates with the actuator output 208. The read head 246 outputs a signal that is indicative of the angular displacement of the magnet 248, and hence actuator output 208, relative to the motor ground 216. While the actuator output sensor 214 of FIG. 3 and FIG. 4 is arranged in an on-axis configuration in which the read head 246 and the magnet 248 are aligned on the axis of rotation of the magnet 248, the actuator output sensor 214 of other embodiments can be arranged in an off-axis configuration in which read head 246 is not aligned on the axis of rotation of the magnet 248.

The actuator 200 can include other sensors in addition to or in the alternative to the spring displacement sensor 212 and the actuator output sensor 214. In the illustrated embodiment, for example, the actuator 200 further includes a commutation sensor 217. According to an example embodiment, the commutation sensor 217 comprises an incremental rotary encoder. The output of the commutation sensor 217 is used in commutation of the motor 204. In the illustrated embodiment, the commutation sensor 217 is a magnetic incremental rotary encoder that comprises a read head 250 (e.g., a magnetic field sensor) and a magnet 252. The read head 250 is fixed relative to the motor ground 216. The read head 250 detects the magnetic field of the ring magnet 252, which rotates with the motor output 226 and hence the rotor 224. The read head 250 can output a signal indicative of the angular displacement of the magnet 252 relative to the motor housing 216 and hence the position of the motor output 226 and the rotor 224 relative to the motor housing 216. The wiring for read head 246 and read head 250 can be run through center shaft 220.

In the illustrated embodiment of FIG. 3 and FIG. 4, the sensor for detecting the rotational position of the actuator output 208 relative to the motor 204 and the commutation sensor 217 are located in the cup formed by the flex spline 244, thus allowing a more compact design. A housing can be provided to protect the read heads or other sensors from grease, etc. in the gearbox 206. In the illustrated embodiment, a grease shield comprises a first portion 254 connected to the motor output 226 and a second portion 256 fixed relative to the motor ground 216. The magnet 252 is fixed to the first portion 254 of the grease shield and thus rotates with the rotor 224.

In some embodiments, the sensors are not arranged in the cavity formed by the flex spline 244. For example, in an example embodiment, the magnet 248 can be located at the end of a shaft that spins with the actuator output 208 and extends from the actuator output 208, through the gearbox 206, and into the center shaft 220. As such, the read head 246 can be located in center shaft 220 or past the end of the center shaft proximate to the opposite end of the actuator 200 from the actuator output 208. Similarly, the magnet 252 used for commutation can be coupled to the other end of the motor output 226 and the read head 250 located proximate to the opposite end of the actuator 200 from the actuator output 208.

As discussed, a spring 210 can be provided between the motor 204 and the actuator ground 202 to act against the rotation of the motor 204 relative to the actuator ground 202. The spring 210 can facilitate measuring torque as the displacement of the motor 204 relative to the actuator ground 202 corresponds to a deflection of the spring 210, which relates to the force and torque. The more compliant the spring 210 the more force resolution the actuator 200 will have. On the other hand, since a stiffer spring has more mechanical bandwidth than a softer spring, a more compliant spring 210 will have a lower mechanical bandwidth.

As the motor ground 216 rotates relative to the actuator ground 202, there is a small deflection. The spring displacement sensor 212, however, senses an amplified torque based on the ratio of the actuator ground 202's diameter to the rotatable sensor shaft 262's diameter. The larger this ratio is made, the more amplification the spring displacement sensor 212 will experience. By increasing this ratio, a stiffer spring 210 with higher mechanical bandwidth can be used, while also getting a high force or torque resolution based on the output of spring displacement sensor 212.

With reference to FIG. 6, an example embodiment of a spring 210 is illustrated. In the illustrated embodiment, the spring 210 is a planar torsion spring. A planar torsion spring's geometry can be designed to minimize the ratio of stress to deflection (or can maximize deflection/stress). Further, a planar torsion spring has a thin profile for an axially compact design. In some embodiments, the spring 210 can be formed of a material that has a high yield strength and low modulus of elasticity, such as Ti-3Al-8V-6Cr-4Mo-4Zr.

The spring 210 has a generally planar shape with an inner ring 270 that is mounted to motor ground 216. A plurality of tangs 272 extends out from the inner ring 270. The number of tangs 272 can be varied based upon the performance capacity required. While the tangs 272 in the illustrated embodiment generally spiral outward from inner ring 270, the tangs 272 can have various shapes. The ends of the tangs 272 distal from the center ring are mounted to the actuator ground 202. Thus, as the motor ground 216 rotates relative to the actuator ground 202, the tangs 272 deflect. The amount of deflection will depend on the force applied.

The actuator 200 can include a variety of other features to facilitate performance. As one example, heat sinks 280 can be provided to transfer heat from motor 204 to the surrounding environment or a heat management system. In the illustrated embodiment, the heat sinks 280 are coupled to the outer circumference of the radially outer housing portion 218 of the motor housing 216 and radially extend (e.g., have radially extending fins) that pass through the outer actuator housing 202. The heat sinks 280 conduct heat generated by the stator 222 to the surrounding environment, including heat which could otherwise be trapped between the motor ground 216 and the actuator ground 202.

The actuator 200 is an example of a radially stacked actuator that has a radial load path between the actuator ground 202 and the actuator output 208. More particularly, the actuator ground 202, the motor 204, the gearbox 206, and the actuator output 208 are arranged about a common longitudinal axis 201 or a common axis of rotation, which can be coaxial with the common longitudinal axis 201. Moreover, the motor 204, the gearbox 206, and the actuator output 208 are circumferentially contained within the actuator ground 202. Further, in the illustrated example, the gearbox 206, and the actuator output are circumferentially contained within the motor ground 216.

As mentioned, radially stacked actuators can have other configurations. For example, in other embodiments, a spring is positioned between the gearbox 206 and the actuator output 208 or at another position, in addition to or instead of the spring 210. While actuator 200 is illustrated as a reverse-style series elastic actuator, the teachings herein can be applied to common (non-reverse) series elastic actuators.

Figure 7:
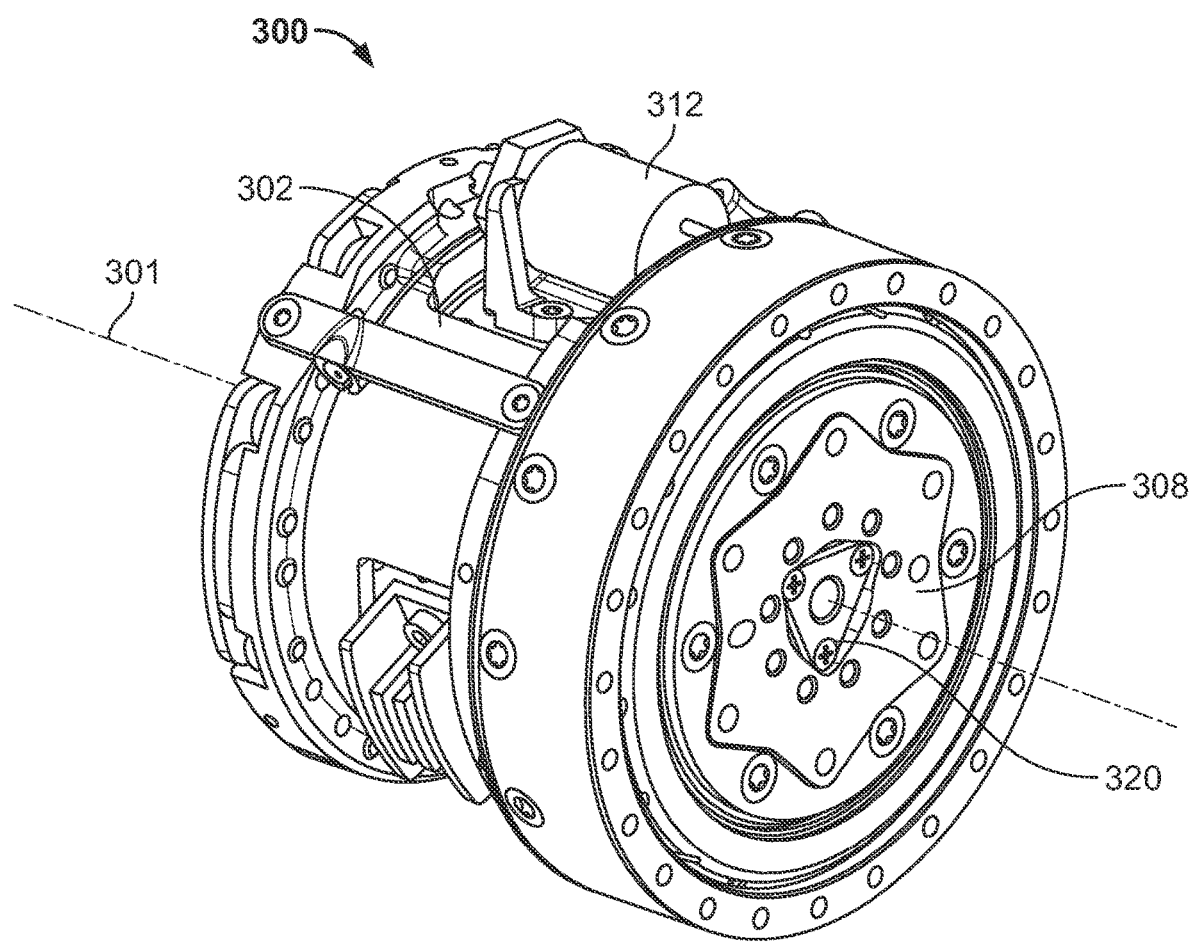
FIG. 7 is a diagrammatic representation of another embodiment of an actuator.
Figure 8:
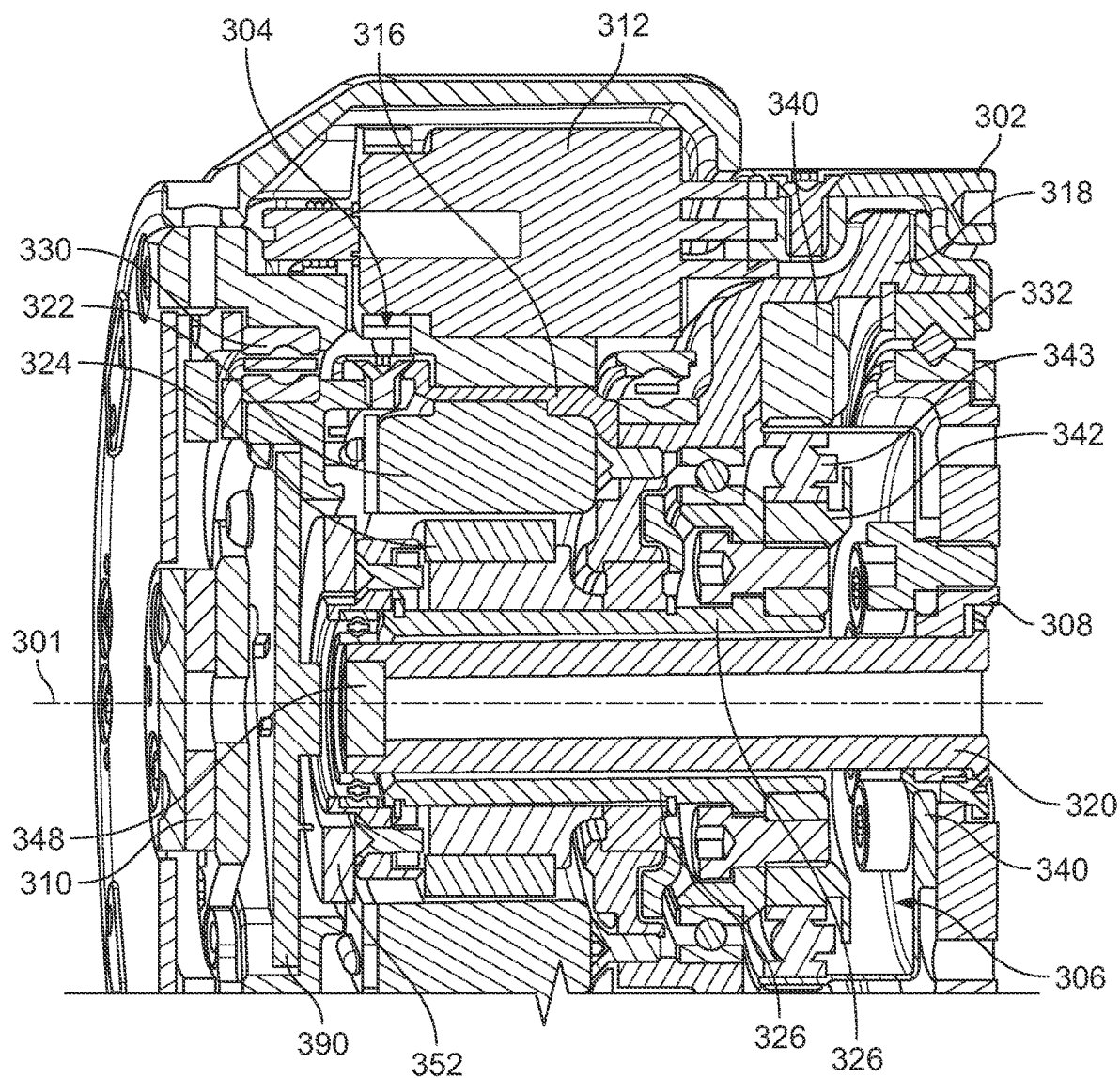
FIG. 8 is a diagrammatic representation of yet another embodiment of an actuator.

FIG. 7 is a diagrammatic representation of another embodiment of a radially stacked actuator 300 and FIG. 8 is a longitudinal cross-sectional view of a portion of actuator 300. While actuator 300 is depicted as a reverse-style series elastic actuator with a load path from ground to a spring to a motor to a gearbox to an output, in which the load path is implemented radially.

In the illustrated embodiment of FIGS. 3 and 4, the actuator 300 comprises an actuator ground 302 provided by an actuator housing 303 (e.g., a shell, a frame, or another structure) that acts as the mechanical ground of the actuator 300. The actuator ground 302 has a generally cylindrical shape with an outer circumference about the longitudinal axis 301 that can vary along the length of the actuator ground 302. The actuator ground 302 defines a cavity—for example, a cylindrical cavity, the diameter of which can vary along the length of the cavity—in which various components of actuator 300 are located. More particularly, the actuator 300 includes a motor 304, a gearbox 306, an actuator output 308, and a spring 310 that are circumferentially contained within the actuator ground 302.

Each of the motor 304, the gearbox 306, and the actuator output 308 can have a circular cross-section with a radius that varies along the length of the respective feature. In the illustrated embodiment, the motor 304, the gearbox 306, the actuator output 308, the spring 310 have longitudinal axes and axes of rotation that are coaxial with the longitudinal axis 301. In other embodiments, the longitudinal axis or the axis of rotation of one or more of the motor 304, the gearbox 306, the actuator output 308, or the spring 310 are not coincident. The actuator 300 further includes a spring displacement sensor 312, an actuator output sensor, and a commutation sensor. The output of the spring displacement sensor 312 is used to determine total force or torque applied by the actuator 300. The output of the actuator output sensor is used to determine the angular displacement of the actuator output 308 relative to the motor ground 316.

The information from the spring displacement sensor 312 and the actuator output sensor can be used to determine the position of the actuator output 308 relative to the actuator ground 302. The actuator output 308 rotates relative to the actuator ground 302 about the axis of rotation, which is coincident with the longitudinal axis 301 of the actuator 300 in some embodiments. The load path from the actuator output 308 to the actuator ground 302 is implemented radially. The actuator ground 302 can be coupled to a support structure, such as to the frame or the shell of a robot or another support structure based on application and the actuator output 308 to a component to be actuated relative to the actuator ground 302 and more particularly, relative to the support structure to which the actuator ground 302 is connected. For example, the actuator ground 302 can be fixed to a first portion of a robot and the actuator output 308 connected to a second portion of the robot such that the actuator 300 can drive flexion/extension, internal/external rotation, abduction/adduction, or other movements of the second portion of the robot relative to the first portion of the robot.

The actuator output 308 is driven by the motor 304 through the gearbox 306. The motor 304 comprises a motor ground 316 relative to which certain components of the motor 304, the gearbox 306, and actuator output 308 rotate. In the illustrated embodiment, a portion of an inner housing 318 provides a motor housing and acts as the mechanical ground for the motor 304 and another portion acts as a gearbox housing. The actuator 300 includes a center shaft 320 that extends from the motor into the gearbox 306. Bearings 330 are provided between the motor ground 316 and the actuator ground 302 to allow the motor 304 to rotate a constrained amount relative to the actuator ground 302. The spring 310, which is protected by a spring cover coupled to the actuator ground 302 in the illustrated embodiment, is disposed between the actuator ground 302 and the motor ground 316. When the motor 304 applies an output, the motor ground 316 can rotate from a neutral position within the actuator ground 302, causing the spring 310 to deflect.

The motor 304 further comprises a stator 322 that is fixed relative to the motor ground 316. For example, stator 322 can be fixed to the radially inner side of the inner housing 318. A rotor 324 that is circumferentially within the stator 322 rotates about a center shaft 320. A motor output 326 is connected to the radially inner side of the rotor 224 and rotates about the center shaft 320 with the rotor 324. The motor output 326 is connected to the input of the gearbox 306 and the output of the gearbox 306 is coupled to the actuator output 308. The actuator output 308 is constrained to the inner housing 318, and thus relative to the motor ground 316, with a bearing 332.

According to an example embodiment, the gearbox 306 is configured to result in a lower speed/higher torque output than the motor 304. In an even more particular embodiment, the gearbox 306 is a harmonic drive. An example embodiment of a harmonic drive gearbox comprises a circular spline 340, a wave generator 342, a wave generator bearing 343, and a flex spline 344. The circular spline 340 is fixed to an inner circumference of the inner housing 318 or is otherwise fixed relative to the motor ground 316. The circular spline 340 has radially interior gear teeth that mesh with gear teeth on the flex spline 344. The wave generator 342 has an elliptical shape or another suitable shape and is inserted in the wave generator bearing 343, causing the wave generator bearing 343 to conform at least partially to the shape of the wave generator 342, while still allowing the wave generator 342 to rotate. The wave generator 342 is connected to the rotor 324 via the motor output 326 and, thus, the motor 304 can drive the wave generator 342. The flex spline 344 has a cup (concave) shape. The end of the cup is mounted to the actuator output 308 (for example, to the longitudinally interior side of the actuator output 308 that is opposite to the output side of the actuator output 308) and the sides of the cup extend longitudinally back to pass between the wave generator bearing 343 and the circular spline 340. The radially exterior side of the flex spline 344 has gear teeth to mesh with the gear teeth of the circular spline 340. As the wave generator 342 rotates, the flex spline 344 deforms.

Rotation of the wave generator 342 results in a slower rotation of the flex spline 344 in the opposite direction. Thus, the harmonic drive converts the output from the motor 304 to a lower speed/higher torque output to drive the actuator output 308.

To facilitate control, various sensors can be provided to determine the position, torque or other metrics of actuator 300. In an example embodiment, a spring displacement sensor 312 is provided to measure the torque applied by the actuator. A variety of sensor types can be used as spring displacement sensor 312. In an example embodiment, for example, spring displacement sensor 312 is a capstan-reduction encoder that amplifies torque resolution. Similar to the arrangement of the actuator 200, the encoder can be fixed to the motor ground 316 and the ends of the capstan cable to the actuator ground.

An actuator output sensor can be provided to measure the rotation of the actuator output 308 relative to the motor 304. A variety of sensor types can be used for the actuator output sensor. According to an example embodiment, the actuator output sensor is an APS. According to an even more particular embodiment, the actuator output sensor comprises a magnetic rotary encoder. With reference to FIG. 8, in the illustrated embodiment, the actuator output sensor comprises a PCB board 390 that has a read head (e.g., a magnetic field sensor) (not denoted) that is fixed relative to the motor ground 316. A magnet 348 of the encoder is coupled to and rotates with the actuator output 308. More particularly, the center shaft 320 is fixed to the actuator output and the magnet 348 is mounted at the end of the center shaft 320 distal from the actuator output 308. The read head of the actuator output sensor detects the magnetic of magnet 348 and outputs a signal indicative of the angular displacement of the actuator output 308 relative to the motor ground 316. The read head and magnet 348 can be arranged in an on-axis or an off-axis configuration.

Further, a commutation sensor can be provided. A variety of sensor types can be used for the commutation sensor. According to an even more particular embodiment, the commutation sensor comprises a rotary encoder, such as a magnetic incremental rotary encoder. In the illustrated embodiment, the magnetic incremental rotary encoder comprises a read head and a ring magnet 352. The ring magnet 352 is mounted to the rotor 324 distal from the gearbox 306 and thus rotates with the rotor 324. The read head (e.g., a magnetic field sensor) is fixed relative to the motor ground 316 (e.g., a read head on PCB board 390). The read head detects the magnetic fields of magnet 352. The detected field will change based on the angular displacement of the magnet 352. The read head can thus output a signal indicative of the angular displacement of magnet 352 and hence the rotor 324 relative to the motor ground. Actuator 300 can include other features, such as heatsinks, or other features discussed above.

Figure 9:
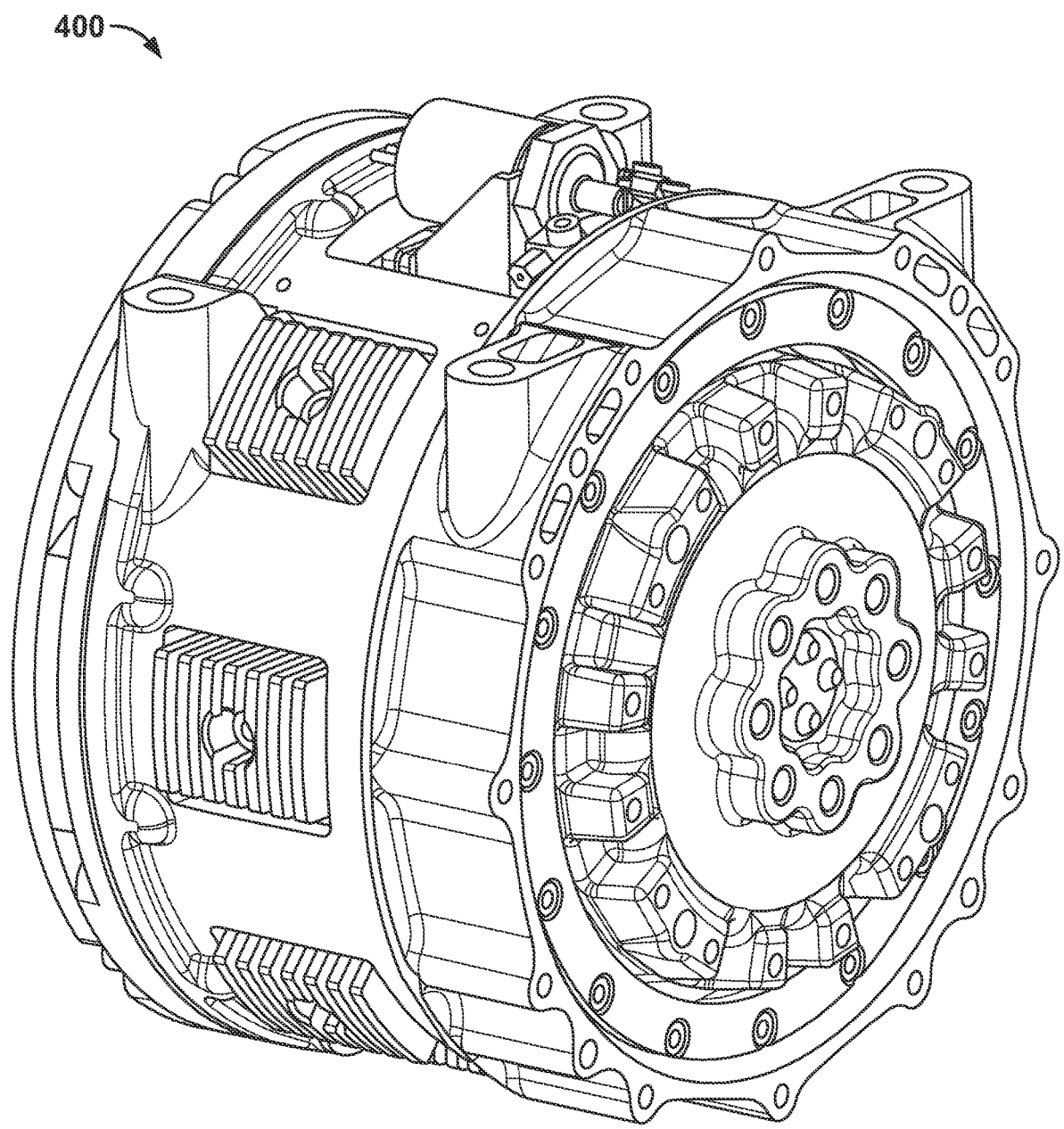
FIG. 9 is a diagrammatic representation of another embodiment of an actuator.
Figure 10:
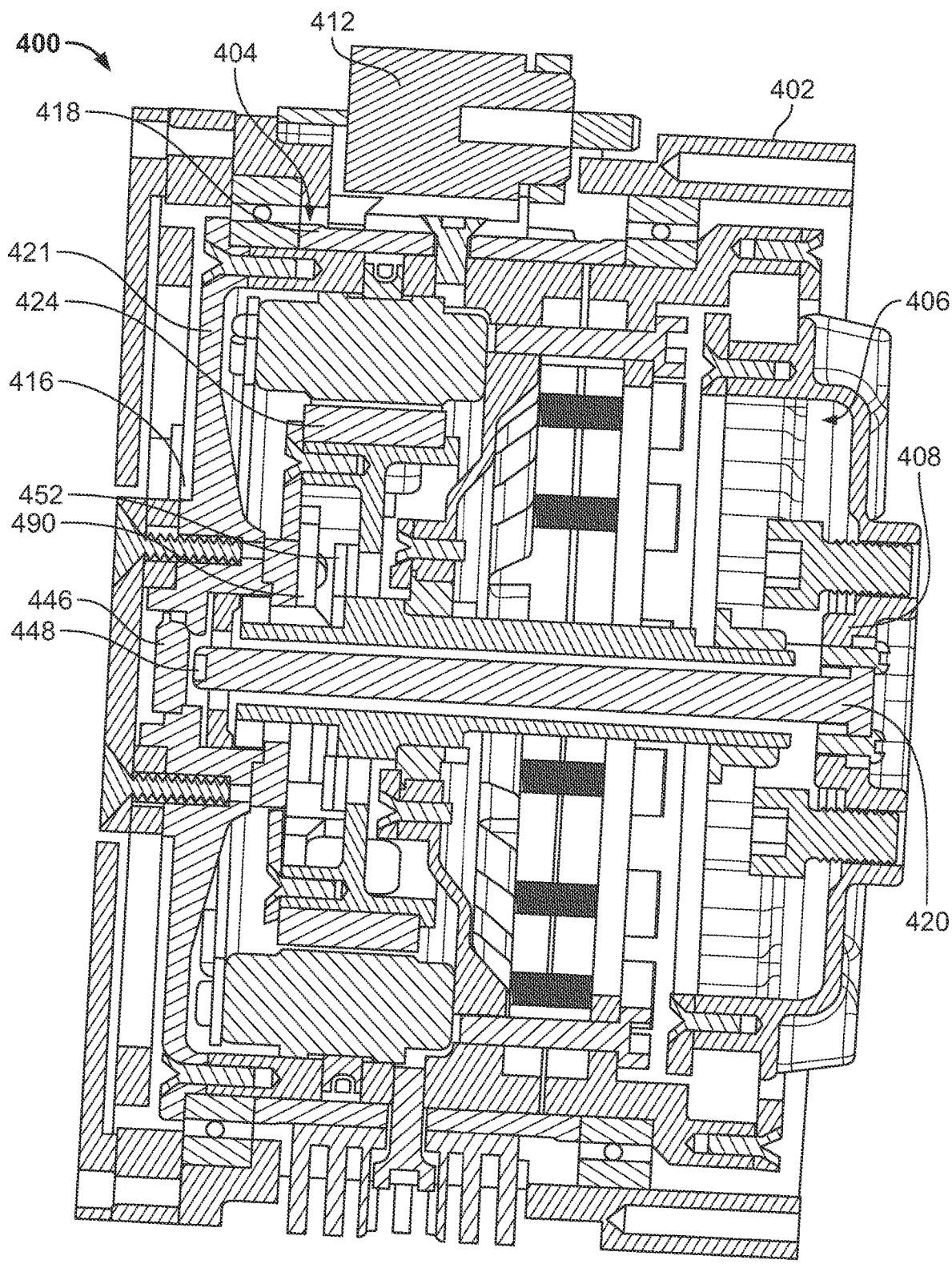
FIG. 10 is a longitudinal cross-sectional view of a portion of an example embodiment of an actuator.

FIG. 9 is a diagrammatic representation of another embodiment of a radially stacked actuator 400 and FIG. 10 is a longitudinal cross-sectional view of a portion of actuator 400. The actuator 400 is radially stacked and comprises an actuator ground 402, a motor 404, a gearbox, and an actuator output 408. The motor 404 includes a motor ground 416 relative to which certain components of the motor 404, the gearbox 406, and actuator output 408 rotate. In the illustrated embodiment, a motor housing acts as the mechanical ground for the motor 404. The motor housing includes a radially outer housing portion 418 and a center shaft 420 that extend longitudinally from an end portion 421. The motor 404 further includes a stator, a rotor that rotates about the longitude axis, a motor output connected to the rotor that rotates with the rotor. The motor output is connected to the input of the gearbox 406 and the output of the gearbox is connected to the actuator output. According to an example embodiment, gearbox 406 is a harmonic drive.

To facilitate control, various sensors can be provided to determine the position, torque, or other metrics of actuator 400. In an example embodiment, a spring displacement sensor 412 is provided to measure the torque applied by actuator 200. A variety of sensor types can be used as spring displacement sensor 412. In an example embodiment, for example, spring displacement sensor 412 is a capstan-reduction encoder that amplifies torque resolution. Similar to the arrangement of the actuator 200, the encoder can be fixed to the motor ground 416 and the ends of the capstan cable to the actuator ground 402.

An actuator output sensor can be provided to measure the angular displacement of the actuator output 408 relative to the motor 404. A variety of sensor types can be used for the actuator output sensor. According to an example embodiment, the actuator output sensor is an APS. According to an even more particular embodiment, the actuator output sensor comprises a magnetic rotary encoder. With reference to FIG. 10, in the illustrated embodiment, the actuator output sensor comprises a PCB board that has a read head 446 (e.g., a magnetic field sensor) that is fixed relative to the motor ground 416. A magnet 448 of the encoder is coupled to and rotates with the actuator output 408. More particularly, the center shaft 420 is fixed to the actuator output and the magnet 448 is mounted at the end of the center shaft 420 distal from the actuator output 408. The read head 446 of the actuator output sensor outputs a signal indicative of the angular displacement of the magnet 448, and hence the actuator output 408, relative to the motor ground. The read head 446 and magnet 448 can be arranged in an on-axis configuration, as illustrated, or an off-axis configuration.

The output of the spring displacement sensor 412 is used to determine total force or torque applied by the actuator. The output of the actuator output sensor is used to determine the rotational displacement of the actuator output 408 relative to the motor ground 416. The information from the spring displacement sensor 412 and the actuator output sensor can be used to determine the rotational position of the actuator output 408 relative to the actuator ground 402.

Further, a commutation sensor can be provided. A variety of sensor types can be used for the commutation sensor. According to an example embodiment, the commutation sensor comprises a rotary encoder. According to an even more particular embodiment, the commutation sensor comprises a magnetic incremental rotary encoder. According to an example embodiment, the magnetic incremental rotary encoder comprises a read head (e.g., a magnetic field sensor) and a ring magnet 452 is mounted to the rotor 424 distal from the gearbox 406 and thus rotates with the rotor 424. The commutation sensor can comprise a read head that is fixed relative to the motor ground 416 (e.g., a magnetic field sensor on PCB board 490). The read head detects the magnetic field of the ring magnet 452. The read head can output a signal indicative of the angular displacement of magnet 452 and hence the rotor 424 relative to the motor ground. Actuator 400 can include other features, such as heatsinks, or other features discussed above.

It can be noted that in actuator 300 the magnet 348 and ring magnet 352 are approximately coplanar (and coplanar in some embodiments) and overlap longitudinally with the magnet 348 being circumferentially within the ring magnet 352. In actuator 400, the magnet 448 and the ring magnet 452 are spaced by a longitudinal distance.

The Appendix, which is hereby fully incorporated as part of this disclosure, provides additional information for some non-limiting embodiments of radially stacked actuators.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when the antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "an example embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in an example embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," and "in an example embodiment."

Thus, while the invention has been described with respect to specific embodiments thereof, these embodiments are merely illustrative, and not restrictive of the invention. Rather, the description is intended to describe illustrative embodiments, features, and functions in order to provide a person of ordinary skill in the art context to understand the invention without limiting the invention to any particularly described embodiment, feature, or function, including any such embodiment, feature, or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes, and substitutions are intended in the foregoing disclosures, and in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A radial stacked actuator, comprising:
   an actuator ground;
   a motor comprising a motor ground constrained to the actuator ground with one or more rotational degrees of freedom;
   a spring coupled between the motor ground and the actuator ground, the spring configured to deflect as the motor ground rotates relative to the actuator ground;
   a gearbox coupled to the motor at an input of the gearbox; and
   an actuator output coupled to an output of the gearbox.

2. The radial stacked actuator of claim 1, wherein a load path defined from the actuator ground to the actuator output is radial.

3. The radial stacked actuator of claim 1, wherein the spring comprises a planar torsion spring.

4. The radial stacked actuator of claim 1, wherein the one or more rotational degrees of freedom is a single degree of rotational freedom.

5. The radial stacked actuator of claim 1, wherein the gearbox is circumferentially contained within the motor ground.

6. The radial stacked actuator of claim 1, wherein each of the motor, the gearbox, and the actuator output comprises a circular cross-section defined by a dimension that varies along a respective longitudinal axis.

7. The radial stacked actuator of claim 1, wherein the actuator ground is configured to fix to a first portion of a humanoid robot, and the actuator output is configured to fix to a second portion of the humanoid robot.

8. The radial stacked actuator of claim 1, wherein the spring is a first spring, the actuator further comprising a second spring positioned between the gearbox and the actuator output.

9. The radial stacked actuator of claim 8, wherein the second spring is configured to deflect as the actuator ground rotates relative to the actuator output.

10. The radial stacked actuator of claim 1, further comprising an actuator housing that comprises the actuator ground.

11. The radial stacked actuator of claim 10, wherein the actuator housing comprises a cylindrical housing defined by a circumference that varies along a longitudinal axis of the actuator housing.

12. The radial stacked actuator of claim 1, wherein the gearbox comprises a harmonic drive.

13. The radial stacked actuator of claim 12, wherein the harmonic drive comprises:
   a circular spline that is fixed relative to the motor ground;
   a wave generator configured to rotate with the motor output;
   a flex spline that is coupled to the actuator output; and
   a wave generator bead ng configured to receive the wave generator contact the flex spline based on a position of the wave generator to cause the flex spline to mesh with the circular spine.

14. The radial stacked actuator of claim 13, further comprising one or more sensors positioned in the gearbox.

15. The radial stacked actuator of claim 14, wherein the one or more sensors are positioned in an interior area of the flex spline.

16. The radial stacked actuator of claim 15, wherein the one or more sensors comprises at least one of an actuator output sensor or a commutation sensor.

17. The radial stacked actuator of claim 1, further comprising an actuator output sensor.

18. The radial stacked actuator of claim 17, wherein the actuator output sensor comprises:
   a read head that is fixed relative to the motor ground; and
   a magnet configured to spin with the actuator output.

19. The radial stacked actuator of claim 18, wherein the read head is configured to read a magnetic field of the magnet and output a signal indicative of the position of the actuator relative to the motor ground based on the magnetic field.

20. The radial stacked actuator of claim 18, wherein the magnet is positioned at a location distal from at least one of the gearbox or the actuator output.

21. The radial stacked actuator of claim 1, further comprising a spring displacement sensor configured to measure a displacement of the motor ground relative to the actuator ground.

22. The radial stacked actuator of claim 21, wherein the spring displacement sensor comprises a capstan-reduction encoder configured to amplify a torque resolution.

23. The radial stacked actuator of claim 21, wherein the spring displacement sensor is configured to measure at least one of a total force or torque applied by the actuator.

24. The radial stacked actuator of claim 21, further comprising an actuator output sensor.

25. The radial stacked actuator of claim 24, wherein the actuator output sensor is configured to determine an angular displacement of the actuator output relative to the motor ground.

26. The radial stacked actuator of claim 25, wherein respective outputs of the spring displacement sensor and the actuator output sensor are configured to determine a position of the actuator output relative to the actuator ground.

27. A method, comprising:
   operating a radial stacked actuator, comprising:
      an actuator ground,
      a motor comprising a motor ground constrained to the actuator ground,
      a spring coupled between the motor ground and the actuator ground,
      a gearbox coupled to the motor at an input of the gearbox, and
      an actuator output coupled to an output of the gearbox;
   during operation, rotating the motor ground relative to the actuator ground with one or more rotational degrees of freedom; and based on the relative movement of the motor ground and actuator ground, deflecting the spring.

28. The method of claim 27, wherein a load path defined from the actuator ground to the actuator output is radial.

29. The method of claim 27, wherein the spring comprises a planar torsion spring.

30. The method of claim 27, wherein the one or more rotational degrees of freedom is a single degree of rotational freedom.

31. The method of claim 27, wherein the gearbox is circumferentially contained within the motor ground.

32. The method of claim 27, wherein the spring is a first spring, and the radial stacked actuator further comprises a second spring positioned between the gearbox and the actuator output, the method further comprising deflecting the second spring as the actuator ground rotates relative to the actuator output.

33. The method of claim 27, wherein each of the motor, the gearbox, and the actuator output comprises a circular cross-section defined by a dimension that varies along a respective longitudinal axis.

34. The method of claim 27, further comprising:
fixing the actuator ground to a first portion of a humanoid robot; and
fixing the actuator output to a second portion of the humanoid robot.

35. The method of claim 27, wherein the radial stacked actuator further comprises an actuator housing that comprises the actuator ground.

36. The method of claim 35, wherein the actuator housing comprises a cylindrical housing defined by a circumference that varies along a longitudinal axis of the actuator housing.

37. The method of claim 27, wherein the radial stacked actuator further comprises an actuator output sensor that comprises a read head that is fixed relative to the motor ground and a magnet that spins with the actuator output.

38. The method of claim 37, further comprising:
reading, with the read head, a magnetic field of the magnet; and
outputting a signal indicative of the position of the actuator relative to the motor ground based on the read magnetic field.

39. The method of claim 38, wherein the magnet is positioned at a location distal from at least one of the gearbox or the actuator output.

40. The method of claim 27, wherein the gearbox comprises a harmonic drive.

41. The method of claim 40, wherein the harmonic drive comprises:
a circular spline that is fixed relative to the motor ground;
a wave generator that rotates with the motor output;
a flex spline that is coupled to the actuator output; and
a wave generator bearing configured to receive the wave generator contact the flex spline based on a position of the wave generator to cause the flex spline to mesh with the circular spine.

42. The method of claim 41, wherein the radial stacked actuator further comprises one or more sensors positioned in the gearbox.

43. The method of claim 42, wherein the one or more sensors are positioned in an interior area of the flex spline.

44. The method of claim 43, wherein the one or more sensors comprises at least one of an actuator output sensor or a commutation sensor.

45. The method of claim 27, wherein the radial stacked actuator further comprises a spring displacement sensor, the method further comprising measuring a displacement of the motor ground relative to the actuator ground with the spring displacement sensor.

46. The method of claim 45, wherein the spring displacement sensor comprises a capstan-reduction encoder configured to amplify a torque resolution.

47. The method of claim 45, further comprising measuring at least one of a total force or torque applied by the actuator with the spring displacement sensor.

48. The method of claim 45, wherein the radial stacked actuator further comprises an actuator output sensor, the method further comprising determining an angular displacement of the actuator output relative to the motor ground with the actuator output sensor.

49. The method of claim 48, further comprising determining a position of the actuator output relative to the actuator ground with respective outputs of the spring displacement sensor and the actuator output sensor.

\* \* \* \* \*

UNITED STATES PATENT AND TRADEMARK OFFICE
CERTIFICATE OF CORRECTION

| | |
|---|---|
| PATENT NO. | : 11,967,882 B2 |
| APPLICATION NO. | : 18/254116 |
| DATED | : April 23, 2024 |
| INVENTOR(S) | : Paul Gloninger Fleury, Nicholas Arden Paine and Jonas Alexan Fox |

It is certified that error appears in the above-identified patent and that said Letters Patent is hereby corrected as shown below:

In the Claims

Claim 13, Column 18, Line 9, delete "bead ng" and insert -- bearing --

Signed and Sealed this
Fourth Day of June, 2024

Katherine Kelly Vidal
*Director of the United States Patent and Trademark Office*